July 14, 1953   N. P. BEDSON   2,645,105
UNIVERSAL JOINT
Filed March 7, 1949

INVENTOR
NOEL PHILLIPS BEDSON
by Hooper, Leonard & Glenn
his attorneys

Patented July 14, 1953

2,645,105

UNITED STATES PATENT OFFICE 2,645,105

UNIVERSAL JOINT

Noel Phillips Bedson, Southport, England, assignor, by mesne assignments, to Blau-Knox Company, Pittsburgh, Pa., a corporation of Delaware Application March 7, 1949, Serial No. 79,924
In Great Britain March 11, 1948

3 Claims. (Cl. 64—8)

This invention relates to metal rolling mills and is concerned with the drives to the rolls which are effected through what are known as wobbler shafts having means which allow the rolls to have a limited amount of movement to accommodate the metal being rolled.

The object of the present invention is to provide improved driving means which provide a large and satisfactory area for the drive whilst allowing the necessary articulation between the driving and driven parts.

The invention consists of a drive for a roll of a metal rolling mill comprising a wobbler shaft having a driving housing at one end and a driven housing at its other end, with a spider at its two ends, each of which comes within a housing, one housing being the shaft driving housing and the other the shaft driven housing, each spider having on a side face of each prong thereof which is a driving face, a bearing block which is engaged by a face on a housing, the interengaging faces of prong and block being part cylindrical so that they can move over one another to accommodate articulation movements of the drive, the peripheral surfaces of the prongs and the bearing blocks thereon where they engage the internal surface of a housing being curved to allow of angular movements between the axis of the wobbler shaft and the axes of the housings.

Referring to the accompanying explanatory drawings.

The drive comprises three main assemblies: a housing A connected to suitable driving means, a wobbler shaft assembly B, and a housing C fixed to a roll.

Figure 3:
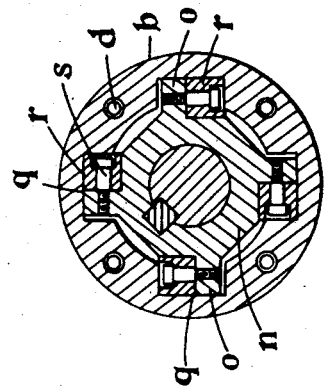
Figure 3 is a sectional end elevation on the line 3—3 of Figure 1.
Figure 2:
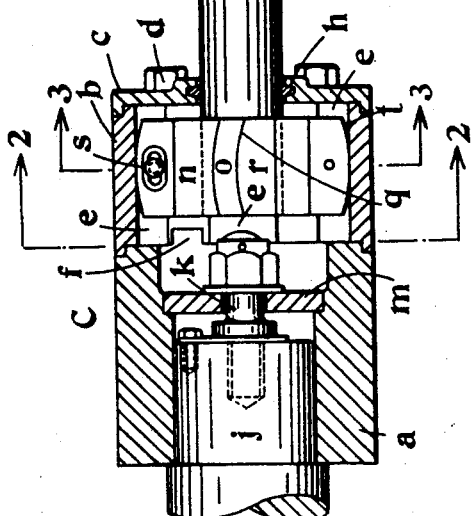
Figure 2 is a sectional end elevation on the line 2—2 of Figure 1.

The housings A and C are similar and each comprises a cylindrical block $a$ to which are attached by means of studs $d$, an annular casing $b$ and a retaining plate $c$. The annular casing has internal axially extending straight sided grooves $e$, as shown in Figures 2 and 3, and is keyed to the block $a$ by means of radial projections $f$ on the block which engage corresponding slots in the casing. The retaining plate $c$ surrounds the wobbler shaft $g$, a clearance being allowed to enable the wobbler shaft to articulate freely, a resilient seal $h$ is provided to exclude dirt and retain lubricant.

A gear wheel $i$ is secured to the housing A and a roll shaft $j$ is secured to the housing C. A drawbolt $k$ which screws into the end of the shaft $j$ clamps a plate $m$ against a shoulder in the block $a$.

Figure 1:
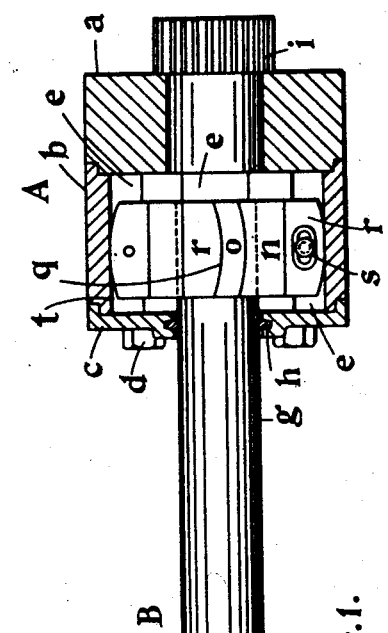
Figure 1 is an elevation of a rolling mill drive constructed in accordance with the invention, the parts housing the wobbler shaft being shown in section.

A spider $n$ is keyed at each end of the wobbler shaft $g$, each spider having four prongs $o$. The pressure face $q$ of each prong is curved and a bearing block $r$, one side of which is correspondingly curved, fits between the prong and the wall of an internal groove $e$ in the casing $b$. As shown in the drawing, with particular reference to Figure 1, the slidably engaging curved surfaces of each prong $o$ and its bearing block $r$ are curved cylindrically about an axis tangential to an imaginary cylindrical surface which is centered on the axis of rotation of the spider $n$ and shaft B and which passes generally through the peripheral surfaces $t$ described in the following paragraph. More specifically, in the illustrated embodiment of the invention each bearing block $r$ is convexly curved and the adjacent prong $o$ is concavely curved where the prong and block engage, said curvature being about an axis lying in the peripheral surface $t$ of an adjacent prong $o$ and bearing block $r$, the four prongs $o$ being symmetrically arranged to project in equally spaced relation from the spider $n$. The bearing blocks $r$ are loosely secured to the prongs $o$ by means of bolts $s$ which pass through elongated holes in the blocks, allowing movement between the blocks and prongs.

The peripheral surfaces $t$ of the prongs $o$ and the bearing blocks $r$ are also curved so that the wobbler shaft can move out of line with the housings when metal passes between the rolls of the mill. The surfaces $t$ are cylindrically curved about an axis extending through and normal to the axis of rotation of the spider $n$ and shaft B, and bear against flat base surfaces of the grooves $e$ which lie in planes parallel to the axis of rotation of the spider $n$ and shaft B and normal to the adjacent flat side surfaces of the grooves $e$. The spiders are of opposite hand to each other so as to bear against the driving and driven parts correctly.

When metal passes through the mill, the axis of the roll is displaced relative to the driving means and the wobbler shaft $g$ takes up an inclined position. During the rotation of the drive, the bearing blocks $r$ move over the curved faces $q$ of the prongs, maintaining an efficient drive having large bearing areas which are unaffected by normal articulation movements.

What I claim is:

1. A universal joint for rolling mill drives and the like, comprising a housing member connectable to one drive shaft and rotatable about an axis therethrough and having an axially extending opening therethrough and a plurality of axially extending grooves indented radially outwardly from said opening, each groove having a flat side surface in a plane parallel to the axis of said housing and having a flat base surface in a plane normal to said side surface and parallel to said axis of the housing, and a spider connectable to another shaft and rotatable about an axis therethrough and having drive means extending into the respective grooves, the drive means in each groove having a peripheral surface axially slidable and rollable against the said base surface of the groove receiving the drive means and cylindrically curved about an axis passing transversely through the said axis of the spider, and each drive means comprising a prong projecting from the spider and a bearing block with a flat surface slidably engaging the said side surface of the groove receiving the drive means and an opposite curved surface slidably engaged by a correspondingly curved surface of the prong, said slidably engaging surfaces of each prong and bearing block being cylindrically curved about an axis tangent to a cylindrical surface which is centered on said axis of the spider and passes generally through said peripheral surfaces of the respective drive means.

2. A universal joint for rolling mill drives and the like, comprising a housing member connectable to one drive shaft and rotatable about an axis therethrough, said housing member having an axially extending opening therethrough and four symmetrically spaced and axially extending grooves indented radially outwardly from said opening, each groove having a flat side surface in a plane parallel to the axis of said housing and having a flat base surface in a plane normal to said side surface and parallel to said axis of the housing, and a spider connectable to another shaft and rotatable about an axis therethrough and having four equally spaced drive means extending into the respective grooves, the drive means in each groove having a peripheral surface axially slidable and rollable against the said base surface of the groove receiving the drive means and curved cylindrically about an axis passing at right angles through said axis of the spider, and each drive means comprising a prong projecting from the spider and a bearing block with a flat surface slidably engaging the said side surface of the groove receiving the drive means and an opposite convex cylindrical surface slidably engaged by a corresponding concave surface of the prong, said slidably engaging surfaces of each prong and bearing block being curved cylindrically about an axis lying in the said peripheral surface of an adjacent drive means.

3. A universal joint for rolling mill drives and the like, comprising a housing member connectable to one drive shaft and rotatable about an axis therethrough, said housing member having an axially extending opening therethrough and a plurality of axially extending grooves indented radially outwardly from said opening, each groove having a flat side surface in a plane parallel to the axis of said housing and having a flat base surface in a plane normal to said side surface and parallel to said axis of the housing, a spider connectable to another shaft and rotatable about an axis therethrough and having drive means extending into the respective slots, the drive means in each groove having a peripheral surface axially slidable and rollable against the said base surface of the groove receiving the drive means and curved cylindrically about an axis passing transversely through said axis of the spider, and each drive means comprising a prong projecting from the spider and a bearing block with a flat surface slidably engaging the said side surface of the groove receiving the drive means and an opposite cylindrical surface slidably engaged by a correspondingly curved surface of the prong, said slidably engaging surfaces of each prong and bearing block being cylindrically curved about an axis tangent to a cylindrical surface which is centered on said axis of the spider and passes generally through said peripheral surfaces of the respective drive means, and means extending from each prong and loosely engaging and holding the adjacent bearing block to the prong, thereby facilitating assembly of the universal joint without interfering with the relative movement between the prongs and bearing blocks necessary for operation of the joint.

NOEL PHILLIPS BEDSON.

References Cited in the file of this patent

UNITED STATES PATENTS

| Number | Name | Date |
|---|---|---|
| 666,144 | Kennedy | Jan. 15, 1901 |
| 1,835,506 | Linn | Dec. 8, 1931 |
| 2,136,947 | Morgan | Nov. 15, 1938 |

FOREIGN PATENTS

| Number | Country | Date |
|---|---|---|
| 514,488 | Great Britain | 1939 |